United States Patent
Mohebbi (10) Patent No.: US 8,797,273 B2
(45) Date of Patent: Aug. 5, 2014

(54) METHOD FOR OPERATING A REPRODUCTION APPARATUS VIA A USER INTERFACE HAVING TOUCH ELEMENTS

(75) Inventor: Kouroush Mohebbi, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 260 days.

(21) Appl. No.: 12/312,761

(22) PCT Filed: Dec. 13, 2006

(86) PCT No.: PCT/US2006/047635
§ 371 (c)(1),
(2), (4) Date: May 26, 2009

(87) PCT Pub. No.: WO2008/073092
PCT Pub. Date: Jun. 19, 2008

(65) Prior Publication Data
US 2010/0060594 A1    Mar. 11, 2010

(51) Int. Cl.
G06F 3/041 (2006.01)
H04N 5/76 (2006.01)
G06F 3/0354 (2013.01)
G06F 3/0488 (2013.01)
H04N 5/85 (2006.01)
H04N 5/781 (2006.01)
H04N 5/907 (2006.01)

(52) U.S. Cl.
CPC .... G06F 3/04886 (2013.01); *G06F 2203/0339* (2013.01); *H04N 5/85* (2013.01); *H04N 5/781* (2013.01); H04N 5/76 (2013.01); *G06F 2203/04806* (2013.01); G06F 3/03547 (2013.01); *H04N 5/907* (2013.01)
USPC .................................. 345/173; 178/18.03

(58) Field of Classification Search
None
See application file for complete search history.

(56) References Cited

U.S. PATENT DOCUMENTS

| | | | |
|---|---|---|---|
| 4,161,001 A | 7/1979 | Sakamoto | |
| 4,428,005 A | 1/1984 | Kubo | |
| 4,736,191 A * | 4/1988 | Matzke et al. | 341/20 |
| 4,821,211 A * | 4/1989 | Torres | 715/853 |
| 4,947,097 A | 8/1990 | Tao | |
| 5,189,355 A | 2/1993 | Larkins et al. | |
| 5,485,175 A * | 1/1996 | Suzuki | 715/841 |
| 5,621,905 A * | 4/1997 | Jewson et al. | 715/841 |
| 5,678,451 A | 10/1997 | Vergneau et al. | |

(Continued)

FOREIGN PATENT DOCUMENTS

| | | |
|---|---|---|
| EP | 198658 | 10/1986 |
| EP | 290803 | 11/1988 |

(Continued)

OTHER PUBLICATIONS

International Search Report, dated Jul. 23, 2007.

*Primary Examiner* — K. Wong
(74) *Attorney, Agent, or Firm* — Robert D. Shedd; Reitseng Lin (57) ABSTRACT

A method for operating a reproduction apparatus via a user interface having a plurality of touch elements enables users to conveniently and efficiently locate desired portions of a file. According to an exemplary embodiment, the method includes detecting a first input to a first one of the touch elements (52), selecting a first portion of the file in response to the first input, detecting a second input to a second one of the touch elements after detecting the first input, and selecting a second portion of the file that exists within the first portion in response to the second input.

19 Claims, 5 Drawing Sheets

(56) References Cited

U.S. PATENT DOCUMENTS

| | | | |
|---|---|---|---|
| 6,115,037 | A | 9/2000 | Sumiyoshi et al. |
| 6,236,400 | B1 * | 5/2001 | Guerrero .................. 715/841 |
| 7,031,596 | B2 | 4/2006 | Sai et al. |
| 7,345,671 | B2 * | 3/2008 | Robbin et al. .............. 345/156 |
| 7,397,467 | B2 * | 7/2008 | Park et al. ................ 345/173 |
| 7,418,670 | B2 * | 8/2008 | Goldsmith .................. 715/810 |
| 7,683,918 | B2 * | 3/2010 | Bohan et al. .............. 345/684 |
| 7,812,826 | B2 * | 10/2010 | Ording et al. ............. 345/173 |
| 2002/0101458 | A1 | 8/2002 | SanGiovanni |
| 2003/0043114 | A1 | 3/2003 | Silfverberg et al. |
| 2003/0122698 | A1 | 7/2003 | Horie et al. |
| 2005/0140657 | A1 | 6/2005 | Park et al. |
| 2005/0202187 | A1 | 9/2005 | Sunagawa et al. |
| 2006/0026521 | A1 | 2/2006 | Hotelling et al. |
| 2006/0044285 | A1 | 3/2006 | Sato et al. |
| 2007/0077024 | A1 | 4/2007 | Toyoda et al. |

FOREIGN PATENT DOCUMENTS

| | | |
|---|---|---|
| EP | 0695984 | 2/1996 |
| EP | 1 251 513 A1 | 10/2002 |
| FR | 2491707 | 4/1982 |
| JP | 07-064706 | 3/1995 |
| JP | 2000-122779 A2 | 10/1998 |
| JP | 1132304 | 2/1999 |
| JP | 2001-157284 | 6/2001 |
| JP | 2001292402 | 10/2001 |
| JP | 2003-333537 | 11/2003 |
| JP | 2004-274191 | 9/2004 |
| JP | 2006-1498 | 1/2006 |
| JP | 2006-139222 A2 | 6/2006 |
| JP | 2006-279968 | 10/2006 |
| JP | 2006-302348 | 11/2006 |
| JP | 2006-331520 | 12/2006 |
| KR | 940006894 | 7/1994 |
| KR | 10-0585384 | 5/2006 |
| KR | 20060043306 | 5/2006 |
| KR | 20060076137 | 7/2006 |
| NL | 7707408 | 1/1978 |
| WO | WO0153925 | 7/2001 |
| WO | WO2004079500 | 9/2004 |
| WO | 2006/017477 A2 | 2/2006 |
| WO | 2007/069799 A1 | 6/2007 |

* cited by examiner

METHOD FOR OPERATING A REPRODUCTION APPARATUS VIA A USER INTERFACE HAVING TOUCH ELEMENTS

This application claims the benefit, under 35 U.S.C. §365 of International Application PCT/US2006/047,635, filed 13 Dec. 2006, which was published in accordance with PCT Article 21(2) on 19 Jun. 2008, in English.

BACKGROUND OF THE INVENTION

1. Field of the Invention

The present invention generally relates to data reproduction apparatuses, and more particularly, to a method for operating a reproduction apparatus via a user interface having a plurality of touch elements that enables users to conveniently and efficiently locate desired portions of a file.

2. Background Information

Apparatuses such as digital video recorders (DVRs) allow users to record, and later reproduce, relatively large amounts of audio and/or video content. Such content may be stored in the form of one or more files. Because the content of such files may be relatively large, users need a mechanism by which they can navigate through the files and locate one or more portions of interest.

One conventional mechanism that enables users to navigate through files of stored content is a jog/shuttle dial, which is often used in the film industry for professional DVRs. A jog/shuttle dial is generally configured as a knob that may be pressed in different directions. For example, pressing the knob to the right can cause content to be moved through in a forward direction (e.g., fast forward function), while pressing the knob to the left can cause content to be moved through in a reverse direction (e.g., rewind function). Pressing the knob harder in either direction may cause the content to be moved through at a more rapid rate, and its video content to be removed from the display device (due to the fast picture movement). While a conventional jog/shuttle dial enables users to navigate through files of stored content, it is disadvantageous in that it is often inconvenient and time-consuming for users to locate a desired portion of a file.

Accordingly, there is a need for an improved technique for enabling users to navigate through files of stored content. The present invention described herein addresses various issues and provides, among other things, a method for operating a reproduction apparatus via a user interface having a plurality of touch elements that enables users to conveniently and efficiently locate desired portions, of a file.

SUMMARY OF THE INVENTION

In accordance with an aspect of the present invention, a method for operating a reproduction apparatus via a user interface having a plurality of touch elements is disclosed. According to an exemplary embodiment, the method comprises steps of detecting a first input to a first one of the touch elements, selecting a first portion of a file in response to the first input, detecting a second input to a second one of the touch elements after detecting the first input, and selecting a second portion of the file that exists within the first portion in response to the second input.

In accordance with another aspect of the present invention, an apparatus is disclosed. According to an exemplary embodiment, the apparatus comprises first means such as a memory for storing a file, and second means such as a processor for detecting inputs to a plurality of touch elements and selecting portions of the file in response to the inputs. According to this exemplary embodiment, the second means detects a first input to a first one of the touch elements, selects a first portion of the file in response to the first input, detects a second input to a second one of the touch elements after detecting the first input, and selects a second portion of the file that exists within the first portion in response to the second input.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
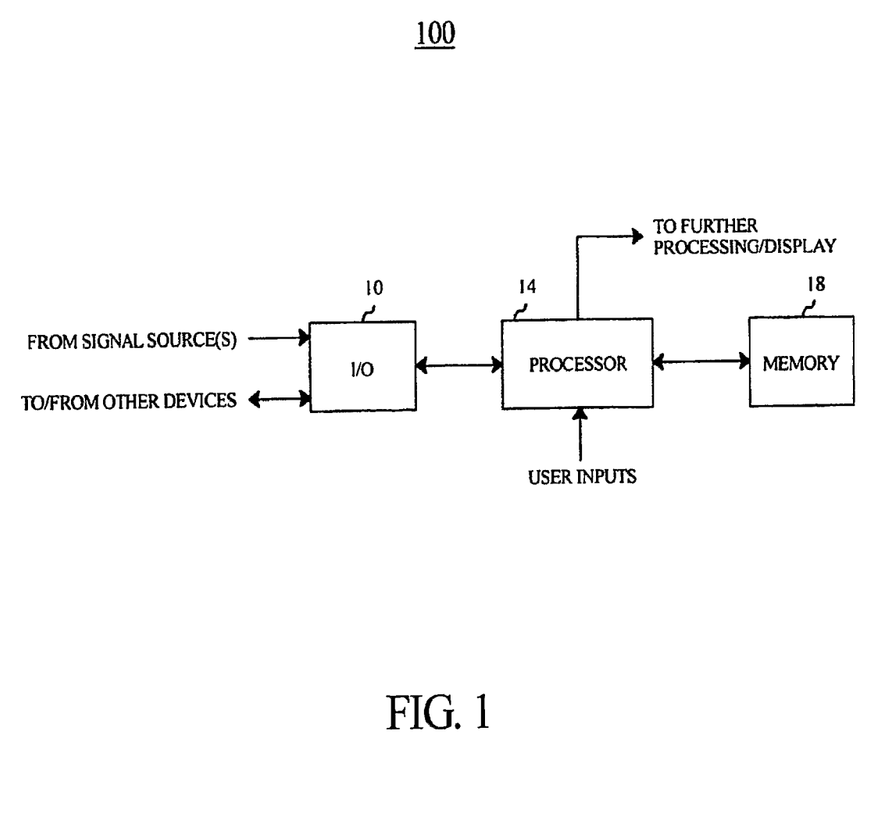
FIG. 1 is a diagram of an apparatus according to an exemplary embodiment of the present invention.

Referring now to the drawings, and more particularly to FIG. 1, an apparatus 100 according to an exemplary embodiment of the present invention is shown. As indicated in FIG. 1, apparatus 100 comprises input/output (I/O) means such as I/O block 10, processing means such as processor 14, and memory means such as memory 18. Some of the foregoing elements of FIG. 1 may be embodied using one or more integrated circuits (ICs). According to an exemplary embodiment, apparatus 100 is embodied as a digital recording and reproduction apparatus such as digital video recorder (DVR), but may also be embodied as another type of apparatus. For clarity of description, certain conventional elements associated with apparatus 100 such as certain control signals, power signals and/or other elements may not be shown in FIG. 1.

I/O block 10 is operative to perform I/O functions of apparatus 100. According to an exemplary embodiment, I/O block 10 is operative to receive signals such as audio, video and/or data signals in analog and/or digital format from one or more signal sources such as terrestrial, cable, satellite, internet and/or other signal sources. I/O block 10 is also operative to output processed signals to one or more other devices, and to receive signals from such devices.

Processor 14 is operative to perform various signal processing and control functions of apparatus 100. According to an exemplary embodiment, processor 14 processes the audio, video and/or data signals provided from I/O block 10 by performing functions including tuning, demodulation, forward error correction, and transport processing functions to thereby generate digital data representing audio, video and/or data content. The digital data produced from such processing functions may be provided for further processing and/or output.

Processor 14 is also operative to execute software code that enables users to conveniently and efficiently locate desired portions of files (e.g., audio and/or video files) stored in memory 18 using a user interface having a plurality of touch elements according to principles of the present invention. Further details regarding these aspects of processor 14 and the aforementioned user interface will be provided later herein. Processor 14 is also operative to perform and/or enable other functions of apparatus 100 including, but not limited to, detecting and processing user inputs, reading and writing data from and to memory 18, and/or other functions.

Memory 18 performs data storage functions of apparatus 100. According to an exemplary embodiment, memory 18 stores digital data including, but not limited to, audio and/or video data files, software code, on-screen display (e.g., menu, etc.) data, user setup data, and/or other data. Memory 18 may be embodied as any type of suitable data storage device(s) such as a hard disk, optical disk, flash memory, and/or any other type of memory element(s).

Figure 2:
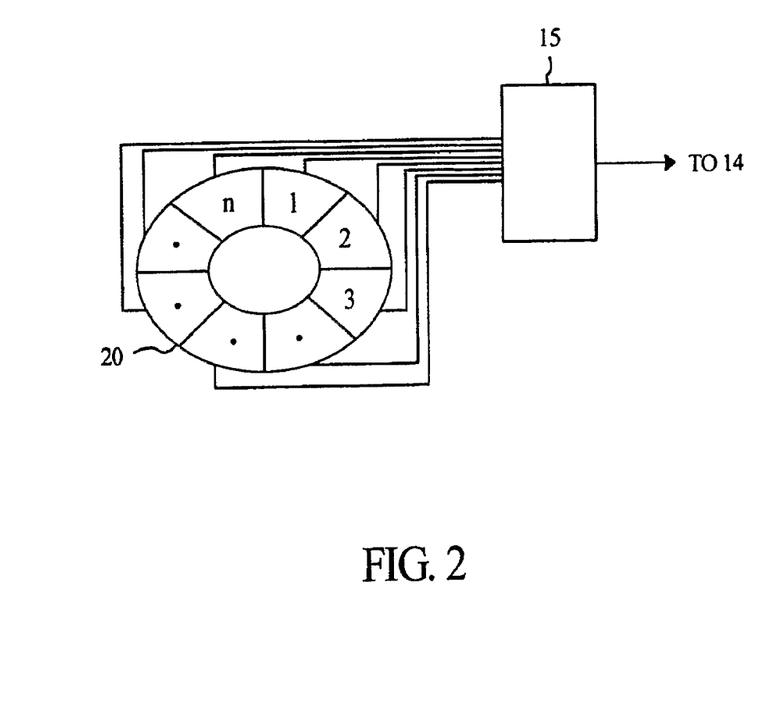
FIG. 2 is a diagram of a user interface having touch elements according to an exemplary embodiment of the present invention.

Referring to FIG. 2, a diagram of a user interface 20 according to an exemplary embodiment of the present invention is shown. As indicated in FIG. 2, user interface 20 comprises a plurality of touch elements 1 to n that are contiguously arranged in a circular manner. User interface 20 may be integrated into apparatus 100 (e.g., included on its front panel), and/or may be included on a remote control device (not shown in FIGS.) of apparatus 100. The number of touch elements, n, included on user interface 20 may be set as a matter of design choice. As will be described later herein, the number of touch elements, n, included on user interface 20 may for example be related to a number of portions of a file, and/or each touch element 1 to n may correspond to a fixed time period.

Touch elements 1 to n are each operatively coupled to an input sensing block 15 that senses user inputs (e.g., touches via finger movement) to touch elements 1 to n, and provides corresponding output signals to processor 14. Input sensing block 15 may, for example, be embodied as a capacitor sensor IC or similar type of device, wherein each touch element 1 to n of user interface 20 is operatively coupled to a given pin of input sensing block 15. According to principles of the present invention, inputs to touch elements 1 to n of user interface 20 allow users to control various functions of apparatus 100.

According to an exemplary embodiment, users can cause apparatus 100 to perform forward and rewind functions via inputs to touch elements 1 to n of user interface 20. For example, a user starting at a predetermined position (e.g., 12:00 position on the circle) and moving his/her finger upon touch elements 1 to n in a clockwise direction may cause apparatus 100 to perform the forward function by moving through a given file in a forward direction. Conversely, a user starting at the 12:00 position and moving his/her finger upon touch elements 1 to n in a counterclockwise direction may cause apparatus 100 to perform the rewind function by moving through a given file in a reverse direction. In this embodiment, processor 14 detects sequential touches of at least two neighboring touch elements, determines a moving direction, and performs either the forward or the rewind function according to the determined direction. The speed at which apparatus 100 performs the forward and/or rewind functions may for example be related to (e.g., directly proportional to) the speed at which the user provides the input. For example, if a user moves his/her finger rapidly upon touch elements 1 to n, the resultant forward/rewind function will be performed rapidly, and vice-versa. File content may also be output while the forward and rewind functions are performed to enable user tracking of a desired portion of a file.

According to another exemplary embodiment, users can cause apparatus 100 to perform a zooming function via inputs to touch elements 1 to n of user interface 20. This zooming function allows users to conveniently and efficiently locate desired portions of a file being reproduced by apparatus 100. The zooming function may be particularly advantageous if the user wants to locate a desired portion of a relatively large file. Further details regarding the zooming function of apparatus 100 will be provided later herein.

Figure 3:
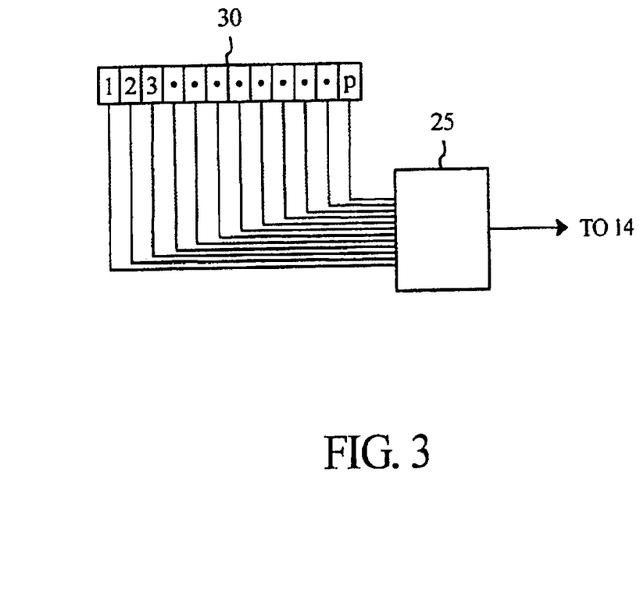
FIG. 3 is a diagram of a user interface having touch elements according to another exemplary embodiment of the present invention.

Referring to FIG. 3, a diagram of a user interface 30 according to another exemplary embodiment of the present invention is shown. As indicated in FIG. 3, user interface 30 comprises a plurality of touch elements 1 to p that are contiguously arranged in a linear manner. User interface 30 may be integrated into apparatus 100 (e.g., included on its front panel), and/or may be included on a remote control device (not shown in FIGS.) of apparatus 100. The number of touch elements, p, included on user interface 30 may be set as a matter of design choice. As will be described later herein, the number of touch elements, p, included on user interface 30 may for example be related to a number of portions of a file, and/or each touch element 1 to p may correspond to a fixed time period.

Touch elements 1 to p are each operatively coupled to an input sensing block 25 that senses user inputs (e.g., touches via finger movement) to touch elements 1 to p, and provides corresponding output signals to processor 14. Input sensing block 25 may, for example, be embodied as a capacitor sensor IC or similar type of device, wherein each touch element 1 to p of user interface 30 is operatively coupled to a given pin of input sensing block 25. According to principles of the present invention, inputs to touch elements 1 to p of user interface 30 allow users to control various functions of apparatus 100.

According to an exemplary embodiment, users can cause apparatus 100 to perform the previously referenced forward and rewind functions via inputs to touch elements 1 to p of user interface 30. For example, a user may move his/her finger upon touch elements 1 to p from the left to the right and thereby cause apparatus 100 to perform the forward function by moving through a given file in a forward direction. Conversely, a user may move his/her finger upon touch elements 1 to p from the right to the left and thereby cause apparatus 100 to perform the rewind function by moving through a given file in a reverse direction. The speed at which apparatus 100 performs the forward and/or rewind functions may for example be related to (e.g., directly proportional to) the speed at which the user provides the input. For example, if a user moves his/her finger rapidly upon touch elements 1 to p of user interface 30, the resultant forward/rewind function will be performed rapidly, and vice-versa. File content may also be output while the forward and rewind functions are performed to enable user tracking of a desired portion of a file.

According to another exemplary embodiment, users can also cause apparatus 100 to perform the previously referenced zooming function via inputs to touch elements 1 to p of user interface 30. As previously indicated above, this zooming function allows users to conveniently and efficiently locate desired portions of a file being reproduced by apparatus 100, and may be particularly advantageous if the user wants to locate a desired portion of a relatively large file. Further details of the zooming function of apparatus 100 will now be described with reference to FIG. 4.

Figure 4:
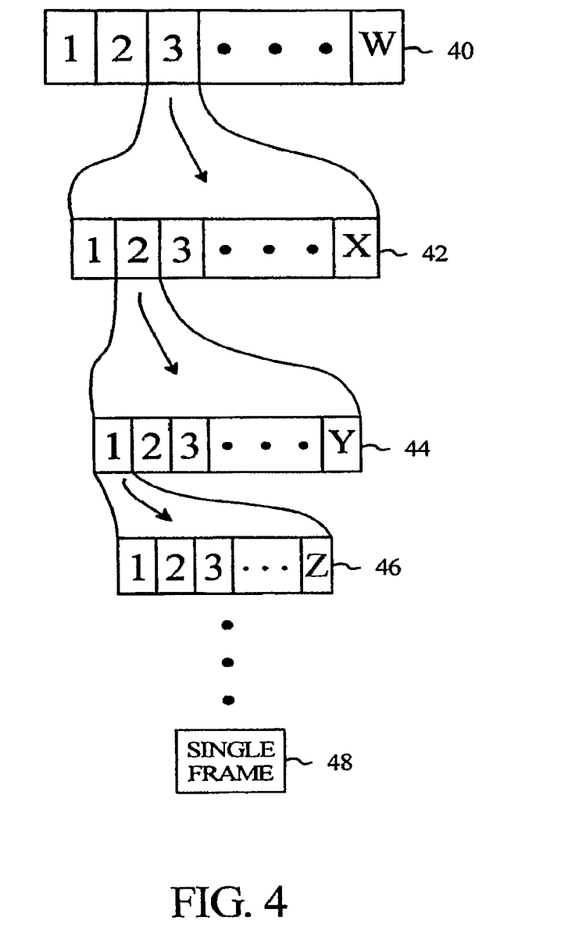
FIG. 4 is a diagram illustrating the arrangement of a file according to an exemplary embodiment of the present invention.

Referring to FIG. 4, a diagram illustrating the arrangement of a file 40 according to an exemplary embodiment of the present invention is shown. As indicated in FIG. 4, file 40 comprises a plurality of portions 1 to W (where W may be any integer). It is assumed herein that each portion 1 to W of file 40 includes audio and/or video content. File 40 may for example represent a given audio and/or video program. According to an exemplary embodiment, processor 14 may cause file 40 to be stored in memory 18 in substantially equal portions (i.e., portions 1 to W are each approximately equal in length/duration). According to this exemplary embodiment, processor 14 may set the value of W equal to the value of n for user interface 20 of FIG. 2, or to the value of p for user interface 30 of FIG. 3. In this manner, the number of touch elements, n and p, included on user interfaces 20 and 30, respectively, may correspond to the number of portions (i.e., 1 to W) of file 40, and/or each touch element 1 to n of user interface 20 and 1 to p of user interface 30 may correspond to a fixed time period.

According to another exemplary embodiment, processor 14 may cause file 40 to be stored in memory 18 in substantially unequal (e.g., irregularly sized) portions based on one or more other parameters, such as the manner in which file 40 was originally authored (e.g., number of segments, chapters, acts, etc.). In either embodiment, it may be desirable for the number of portions W of file 40 to be less than or equal to the number of touch elements, n and p, included on user interfaces 20 and 30, respectively. This is not, however, a requirement of the present invention.

At indicated in FIG. 4, it is assumed that a user has selected portion 42 (i.e., the third portion) of file 40 as being of interest. This selection may be made for example while file 40 is being reproduced by apparatus 100. According to an exemplary embodiment, the user selects portion 42 (i.e., the third portion) of file 40 by pressing and holding touch element number 3 of user interface 20 or 30 for a predetermined time period, or by touching touch element number 3 of user interface 20 or 30 while providing another predetermined input (e.g., pressing select key on a remote control device, etc.). As used herein, holding a touch element means pressing the touch element longer than the pressing time for touching. For example, in performing the forward or rewind function, touching elements are touched not held. Processor 14 detects this input selection by the user and responds by selecting portion 42 (i.e., the third portion) of file 40. Processor 14 may select portion 42 by retrieving it from memory 18 and/or by setting memory pointers to correspond to the selected portion.

As further indicated in FIG. 4, portion 42 (i.e., the third portion) of file 40 comprises a plurality of portions 1 to X (where X may be any integer). Here, it is assumed that the user has further selected portion 44 (i.e., the second portion) of portion 42 as being of interest. According to an exemplary embodiment, the user selects portion 44 (i.e., the second portion) of portion 42 by pressing and holding touch element number 2 of user interface 20 or 30 for a predetermined time period, or by touching touch element number 2 of user interface 20 or 30 while providing another predetermined input (e.g., pressing select key on a remote control device, etc.). Processor 14 detects this input selection by the user and responds by selecting portion 44 (i.e., the second portion) that exists within portion 42. Processor 14 may select portion 44 by adjusting its memory pointers to correspond to the newly selected portion.

As further indicated in FIG. 4, portion 44 (i.e., the second portion) of portion 42 comprises a plurality of portions 1 to Y (where Y may be any integer). Here, it is assumed that the user has further selected portion 46 (i.e., the first portion) of portion 44 as being of interest. According to an exemplary embodiment, the user selects portion 46 (i.e., the first portion) of portion 44 by pressing and holding touch element number 1 of user interface 20 or 30 for a predetermined time period, or by touching touch element number 1 of user interface 20 or 30 while providing another predetermined input (e.g., pressing select key on a remote control device, etc.). Processor 14 detects this input selection by the user and responds by selecting portion 46 (i.e., the first portion) that exists within portion 44. Processor 14 may select portion 46 by adjusting its memory pointers to correspond to the newly selected portion.

The aforementioned process may be repeatedly performed in response to one or more additional inputs to touch elements of user interface 20 or 30 until an Nth portion of file 40 representing a single frame 48 is selected. Of course, file content may be output during the selection process depicted in FIG. 4 to enable user tracking of a desired portion of file 40. With the exemplary embodiment of FIG. 4 described above, it may also be desirable for X, Y and Z to be set less than or equal to the number of touch elements, n and p, included on user interfaces 20 and 30, respectively, to facilitate a more user-friendly interface. This is not, however, a requirement of the present invention.

Figure 5:
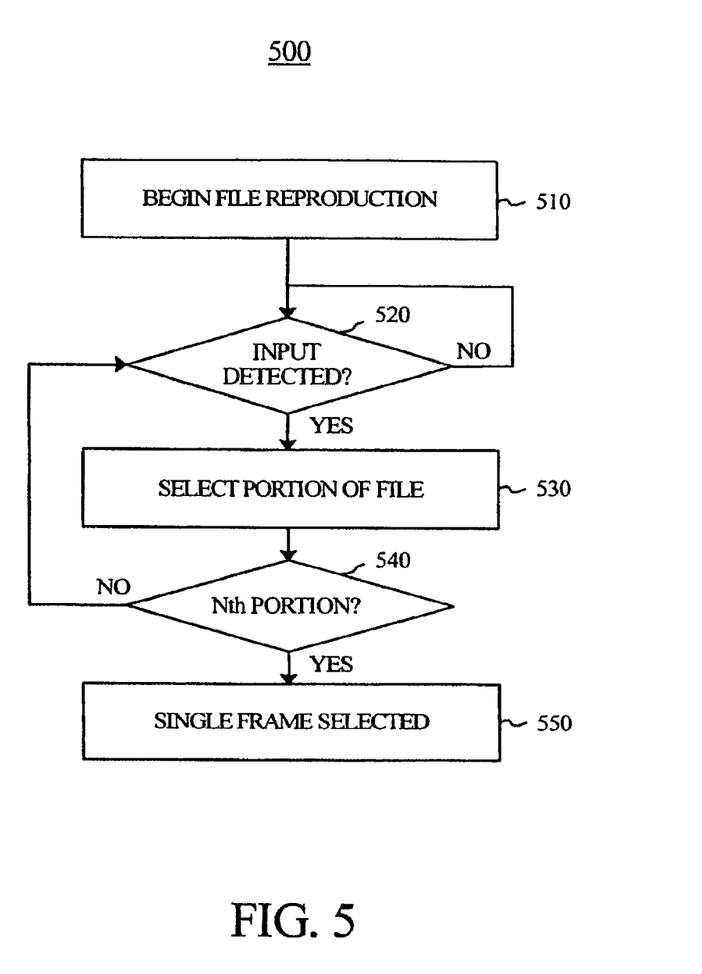
FIG. 5 is a flowchart illustrating steps for operating a reproduction apparatus via a user interface having a plurality of touch elements according to an exemplary embodiment of the present invention.

Referring to FIG. 5, a flowchart 500 illustrating steps for operating a reproduction apparatus via a user interface having a plurality of touch elements according to an exemplary embodiment of the present invention is shown. For purposes of example and explanation, the steps of FIG. 5 will be described with reference to apparatus 100 of FIG. 1, user interfaces 20 and 30 of FIGS. 2 and 3, respectively, and file 40 of FIG. 4. The steps of FIG. 5 are exemplary only, and are not intended to limit the present invention in any manner.

At step 510, file reproduction begins. According to an exemplary embodiment, the user may navigate through one or more on-screen menus provided by apparatus 100 using an input device (e.g., user interface 20 or 30, remote control device, etc.) and thereby select a given file of interest that is stored on memory 18. The user may then provide one or more predetermined inputs which cause apparatus 100 to begin reproducing the selected file at step 510 under the control of processor 14. For purposes of example and explanation, assume that file 40 shown, in FIG. 4 is being reproduced at step 510.

At step 520, apparatus 100 determines whether a predetermined input to is detected. According to an exemplary embodiment, processor 14 detects a predetermined input at step 520 that includes a user pressing and holding one of the touch elements 1, to n of user interface 20 or one of the touch elements 1 to p of user interface 30 for a predetermined time period, or a user touching one of these touch elements of user interface 20 or 30 while providing another predetermined input (e.g., pressing select key on a remote control device, etc.). As indicated in FIG. 5, step 520 is repeatedly performed until processor 14 detects a predetermined input.

Once a predetermined input is detected at step 520, process flow advances to step 530 where apparatus 100 selects a portion of file 40 corresponding to the detected input. According to an exemplary embodiment, processor 14 selects portion 42 (i.e., the third portion) of file 40 at the first iteration of step 530 in response to the user pressing and holding touch element number 3 of user interface 20 or 30 for a predetermined time period, or by touching touch element number 3 of user interface 20 or 30 while providing another predetermined input (e.g., pressing select key on a remote control device, etc.). Processor 14 selects portion 42 (i.e., the third portion) of file 40 at step 530 by retrieving it from memory 18 and/or, by setting memory pointers to correspond to the selected portion.

From step 530, process flow advances to step 540 where processor 14 determines whether the portion of file 40 selected at step 530 is an Nth portion of file 40 representing a single frame. If the determination at step 540 is negative, process flow loops back to step 520 where processor 14 continues to determine whether a predetermined input is detected.

Once another predetermined input is detected at step 520, process flow again advances to step 530 where apparatus 100 selects a portion of file 40 corresponding to the detected input. According to an exemplary embodiment, processor 14 selects portion 44 (i.e., the second portion) of portion 42 at the second iteration of step 530 in response to the user pressing and holding touch element number 2 of user interface 20 or 30 for a predetermined time period, or by touching touch element number 2 of user interface 20 or 30 while providing another predetermined input (e.g., pressing select key on a remote control device, etc.). Processor 14 selects portion 44 (i.e., the second portion) of portion 42 at the second iteration of step 530 by adjusting its memory pointers to correspond to the newly selected portion.

Upon a negative determination at step 540, process flow again loops back to step 520 where another predetermined input may be detected. Once another predetermined input is detected at step 520, process flow again advances to step 530 where apparatus 100 selects a portion of file 40 corresponding to the detected input. According to an exemplary embodiment, processor 14 selects portion 46 (i.e., the first portion) of portion 44 at the third iteration of step 530 in response to the user pressing and holding touch element number 1 of user interface 20 or 30 for a predetermined time period, or by touching touch element number 1 of user interface 20 or 30 while providing another predetermined input (e.g., pressing select key on a remote control device, etc.). Processor 14 selects portion 46 (i.e., the first portion) of portion 44 at step 530 by retrieving it from memory 18 and/or by setting memory pointers to correspond to the selected portion.

The aforementioned process may be repeatedly performed until a positive determination by processor 14 at step 540 indicates that an Nth portion of file 40 representing a single frame 48 is selected at step 550. Also, a user may zoom out level by level to a desired portion of file 40 by providing one or more predetermined inputs to apparatus 100, such as by pressing and holding one or more touch elements of user interface 20 or 30 for a predetermined time period, or by touching one or more touch elements of user interface 20 or 30 while providing another predetermined input (e.g., pressing select key on a remote control device, etc.).

As described herein, the present invention provides a method for operating a reproduction apparatus via a user interface having a plurality of touch elements that enables users to conveniently and efficiently locate desired portions of a file. The present invention may be applicable to various apparatuses, either with or without an integrated display device. While this invention has been described as having a preferred design, the present invention can be further modified within the spirit and scope of this disclosure.

This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method for operating a reproduction apparatus via a user interface having a plurality of touch elements, said method comprising:
   selecting a file for reproduction;
   detecting a first input to a first one of said touch elements, wherein each of said touch elements corresponds to a respective portion of said file;
   selecting a first portion of said file in response to said first input;
   detecting a second input to a second one of said touch elements after detecting said first input, wherein each of said touch elements corresponds to a respective portion of said first portion of said file; and
   selecting a second portion of said file that exists within said first portion in response to said second input, wherein said file is reproduced from a point in said second portion of said file.

2. The method of claim 1, wherein said touch elements are contiguously arranged in a circular manner.

3. The method of claim 1, wherein said touch elements are contiguously arranged in a linear manner.

4. The method of claim 1, wherein:
   said first portion of said file includes a plurality of portions including said second portion; and
   each of said touch elements corresponds to a different portion of said first portion when said second input is detected.

5. The method of claim 1, wherein:
   said first input includes holding said first touch element for a predetermined time period; and
   said second input includes holding said second touch element for said predetermined time period.

6. The method of claim 1, further comprising:
   detecting a third input to one of said touch elements after detecting said second input, wherein each of said touch elements corresponds to a respective portion of said second portion of said file; and
   selecting a third portion of said file that exists within said first and second portions in response to said third input, wherein said file is reproduced from a point in said third portion of said file.

7. The method of claim 6, further comprised of selecting one or more additional portions of said file that exist within said first, second and third portions in response to one or more additional inputs to said touch elements until an Nth portion of said file representing a single frame is selected.

8. The method of claim 1, wherein said file includes at least one of audio and video content.

9. An apparatus, comprising:
   a memory for storing a file;
   a processor for selecting said file for reproduction, detecting a first input to a first one of a plurality of touch elements, wherein each of said touch elements corresponds to a respective portion of said file, selecting a first portion of said file in response to said first input, detecting a second input to a second one of said touch elements after detecting said first input, wherein each of said touch elements corresponds to a respective portion of said first portion of said file, and selecting a second portion of said file that exists within said first portion in response to said second input, wherein said file is reproduced from a point in said second portion of said file.

10. The apparatus of claim 9, wherein said touch elements are included on a front panel of said apparatus.

11. The apparatus of claim 9, wherein said touch elements are included on a remote control device of said apparatus.

12. The apparatus of claim 9, wherein said touch elements are contiguously arranged in a circular manner.

13. The apparatus of claim 9, wherein said touch elements are contiguously arranged in a linear manner.

14. The apparatus of claim 9, wherein:
    said first portion of said file includes a plurality of portions including said second portion; and
    each of said touch elements corresponds to a different portion of said first portion when said second input is detected.

15. The apparatus of claim 9, wherein:
    said first input includes holding said first touch element for a predetermined time period; and
    said second input includes holding said second touch element for said predetermined time period.

16. The apparatus of claim 9, wherein said processor detects a third input to one of said touch elements after detecting said second input, each of said touch elements corresponding to a respective portion of said second portion of said file, and selects a third portion of said file that exists within said first and second portions in response to said third input, wherein said file is reproduced from a point in said third portion of said file.

17. The apparatus of claim 16, wherein said processor selects one or more additional portions of said file that exist within said first, second and third portions in response to one or more additional inputs to said touch elements until an Nth portion of said file representing a single frame is selected.

18. The apparatus of claim 9, wherein said file includes at least one of audio and video content.

19. A playback apparatus for reproducing a file including at least one of audio and video content, comprising:
    a memory for storing a file;
    a plurality of touch elements;
    a processor for selecting said file for reproduction, detecting a first input to a first one of a plurality of touch elements, wherein each of said touch elements corresponds to a respective portion of said file, selecting a first portion of said file in response to said first input, detecting a second input to a second one of said touch elements after detecting said first input, wherein each of said touch elements corresponds to a respective portion of said first portion of said file, and selecting a second portion of said file that exists within said first portion in response to said second input, wherein said touch elements are arranged one after another, and wherein when said processor detects signals indicating sequential touches of at least two neighboring touch elements, said processor performs one of a forward and a rewind function according to a direction of said sequential touches and wherein said first and second inputs last for at least a predetermined time and a duration of a sequential touch is shorter than the predetermined time.

\* \* \* \* \*